US 8,737,052 B2

(12) United States Patent
Cho et al.

(10) Patent No.: US 8,737,052 B2
(45) Date of Patent: May 27, 2014

(54) MOBILE TERMINAL

(75) Inventors: Sang Chul Cho, Seoul (KR); Jang Won Lee, Seoul (KR)

(73) Assignee: Bluebird Soft Co., Ltd. (KR)

( * ) Notice: Subject to any disclaimer, the term of this patent is extended or adjusted under 35 U.S.C. 154(b) by 269 days.

(21) Appl. No.: 13/383,413

(22) PCT Filed: Jul. 14, 2010

(86) PCT No.: PCT/KR2010/004586
§ 371 (c)(1),
(2), (4) Date: Jan. 10, 2012

(87) PCT Pub. No.: WO2011/008025
PCT Pub. Date: Jan. 20, 2011

(65) Prior Publication Data
US 2012/0111711 A1 May 10, 2012

(30) Foreign Application Priority Data
Jul. 14, 2009 (KR) .................. 10-2009-0064224

(51) Int. Cl.
*G06F 1/16* (2006.01)
(52) U.S. Cl.
USPC .............. 361/679.3; 361/679.08; 361/679.55; 361/679.56; 200/5 A; 455/575.1; 455/575.8
(58) Field of Classification Search
USPC ..................................................... 361/679.3
See application file for complete search history.

(56) References Cited

U.S. PATENT DOCUMENTS

| 5,681,122 | A  | * | 10/1997 | Burke ........................... 400/472 |
| 5,734,136 | A  | * | 3/1998  | Newcomer et al. ........... 200/5 A |
| 5,749,457 | A  | * | 5/1998  | Castaneda et al. ............ 200/343 |
| 6,078,792 | A  | * | 6/2000  | Phillips ....................... 455/575.1 |
| 6,721,651 | B1 | * | 4/2004  | Minelli ......................... 701/538 |
| 6,844,845 | B1 | * | 1/2005  | Whiteside et al. ........ 342/357.64 |
| 7,365,281 | B2 | * | 4/2008  | Yamaguchi et al. ........ 200/302.1 |
| 7,551,949 | B2 | * | 6/2009  | Schworm ................... 455/575.1 |
| 7,772,507 | B2 | * | 8/2010  | Orr et al. ....................... 200/5 R |
| 7,926,818 | B2 | * | 4/2011  | Isono ............................. 277/630 |
| 8,032,194 | B2 | * | 10/2011 | Liu et al. .................... 455/575.8 |
| 8,050,019 | B2 | * | 11/2011 | Wennemer et al. ...... 361/679.08 |

(Continued)

FOREIGN PATENT DOCUMENTS

| CN | 1578173 A    | 2/2005 |
| JP | 2001053847 A | 2/2001 |

(Continued)

*Primary Examiner* — Anthony Q Edwards (57) ABSTRACT

Disclosed is a mobile terminal. The mobile terminal of the present invention comprises: a front case having a keypad-accommodating portion; a rear case attachably/detachably coupled to a rear surface of the front case such that a component-accommodating space, in which a main PCB is arranged, is interposed between the front case and the rear case; and a keypad which has a plurality of key buttons, and which is made of a flexible material, and which is accommodated in the keypad-accommodating portion of the front case. The keypad has an edge on which a water-resistant blade extends toward the keypad-accommodating portion. The keypad-accommodating portion has a bottom surface on which a blade insertion rain is formed to enable a portion of the water-resistant blade to be inserted into the rail. The mobile terminal of the present invention has a simple structure to enable easy manufacture and assembly, and in particular prevents water or moisture from entering a keypad area.

20 Claims, 10 Drawing Sheets

(56) References Cited

U.S. PATENT DOCUMENTS

| | | | |
|---|---|---|---|
| 2004/0089570 A1* | 5/2004 | Chien et al. | 206/320 |
| 2005/0181843 A1* | 8/2005 | Tsujimoto | 455/575.1 |
| 2006/0171107 A1* | 8/2006 | Yamamoto et al. | 361/683 |
| 2007/0109730 A1* | 5/2007 | Shigyo et al. | 361/600 |
| 2008/0081679 A1* | 4/2008 | Kawasaki et al. | 455/575.8 |

FOREIGN PATENT DOCUMENTS

| | | |
|---|---|---|
| JP | 2005129770 A | 5/2005 |
| JP | 2008-010599 | 1/2008 |
| KR | 10-2005-0050424 | 5/2005 |
| KR | 10-2007-0010508 A | 1/2007 |

* cited by examiner

MOBILE TERMINAL

TECHNICAL FIELD

The present invention relates to a mobile terminal, and more particularly to a mobile terminal which has a structure simple and uncomplicated to be easily manufactured and assembled, and specially prevents water or moisture from entering a keypad area.

BACKGROUND ART

A mobile terminal is a terminal freely usable while moving without regard to places. As a representative mobile terminal, there is a cellular phone or the like mobile communication terminal, a personal digital assistant (PDA), etc. Therefore, the term 'mobile terminal' involves the PDA, the cellular phone, etc., but the following descriptions will be limited to the PDA for the convenience of explanation.

In complicated and diversified society, individuals each have felt the need to store and keep personal information in his/her own ways, and thus various products have been launched in the market so as to meet the personal needs. One of them is the PDA. The PDA is also called a pocket computer, which is a generic term for palm-sized small devices having calculation, information storage and searching functions for personal or business use. Occasionally, it has been mostly used in maintaining information about a schedule calendar, an address book, etc.

In particular, an industrial PDA has currently been mainly used in the distribution industry, but its market has been gradually spread. The industrial PDA refers to a PDA having various office functions, such as a barcode scanner, a credit card machine, etc. not present in a general PDA. If the industrial PDA is used, it is advantageous to efficiently progress delivery, data management, related business, etc. For example, an insurance broker of an insurance company can directly process various insurance-related tasks such as customer information management, customer searching, scheduling, a daily record of consultation, memorial day searching, funds statement processing, etc. on the spot through the PDA; a medical worker of a hospital can input or search X-ray image and graphic data as well as medical records and history of a patient, and a prescription through the industrial PDA without being constrained by time and places; and a traffic or patrol cop of the police can perform a crackdown outside of the office through the industrial PDA so that a fine levied for violation of the traffic regulations, the payment of which is currently possible after a lapse of 2 or 3 days from the crackdown, can be directly paid to banking facilities, and it is thus possible for the traffic or patrol cop to remarkably reduce a time taken in the crackdown outside of the office.

As used in various industrial fields, the industrial PDA is required to meet conditions above a predetermined level to endure an industrial environment other than a general environment unlike a general PDA. For example, it is absolutely predictable that the industrial PDA may be used in a refrigerated warehouse at 10 or less degrees below zero or may be used outdoors for a long time, unlike the general PDA. Further, the industrial PDA has to have shock resistance, water-resistant property, heat-resisting property/cooling function, etc. above a predetermined level to raise competiveness as a product since a postman or the like user may carelessly handle it on business. Thus, it is essential that the industrial PDA has to not only be stronger and harder than the general PDA but also have the water-resistant property to keep out rain and snow. However, the outer appearance of the industrial PDA is considerably larger than that of the general PDA since it is designed to have a structure for satisfying the foregoing conditions such as shock resistance, water-resistant property, heat-resisting property/cooling function, etc. above a predetermined level and has to be mounted with a barcode scanner or the like as described above. Therefore, it is needed to reduce the size of the PDA so as to be conveniently used by Asians who have a smaller hand than Westerners.

Meanwhile, among conventional mobile terminals, the industrial PDA includes a keypad with a plurality of key buttons. Through the key buttons, it is possible to carry out writing work such as various messages and memo as well as a telephone call.

At this time, the keypad should not be easily broken down or malfunction due to water, moisture or the like. Therefore, the mobile terminal such as the industrial PDA has to prevent water from entering a keypad area and causing the breakdown or malfunction of the keypad. Of course, convenient assembly and easy maintenance are essential.

However, in the conventional mobile terminal, and particularly in the industrial PDA, the keypad is mostly assembled without any water-resistant structure. Although the keypad has a water-resistant structure, its structure is not only complicated but also uneasy to be manufactured and assembled. Since such a complicated structure and difficulty in the manufacture and assembly increase a production cost undesirably.

DISCLOSURE OF INVENTION

Technical Problem

The present inventive concept provides a mobile terminal which has a structure simple and uncomplicated to be easily manufactured and assembled, and specially prevents water or moisture from entering a keypad area.

Advantageous Effects

According to the present inventive concept, there is provided a mobile terminal which has a structure simple and uncomplicated to be easily manufactured and assembled, and specially prevents water or moisture from entering a keypad area.

BEST MODE FOR CARRYING OUT THE INVENTION

According to an aspect of the present inventive concept, there is provided a mobile terminal including a front case including a keypad-accommodating portion; a rear case detachably coupled to the front case at a rear surface of the front case with a component accommodating space, in which a main printed circuit board (PCB) is arranged, therebetween; and a keypad of a flexible material accommodated in the keypad-accommodating portion of the front case and provided with a plurality of key buttons, the keypad including a water-resistant blade placed at an edge thereof and extending toward the keypad-accommodating portion, and the keypad-accommodating portion including a blade-insertion rail placed on a bottom thereof and partially inserting the water-resistant blade therein.

The water-resistant blade may be continuously formed along a circumferential direction of the keypad, and the blade-insertion rail may be shaped like a continuous closed loop corresponding to the water-resistant blade.

The blade-insertion rail may be formed by an outer wall of the keypad-accommodating portion and a protrusion rib protruding from the bottom of the keypad-accommodating portion at a position spaced apart from the outer wall.

The outer wall of the keypad-accommodating portion may be formed with a plurality of protrusions protruding toward a center area of the keypad-accommodating portion, and the edge of the keypad may be formed with a groove to be arranged corresponding to and be fit with the protrusion.

The protrusion and the groove may be shaped like a waveform.

The mobile terminal may further include a keypad PCB smaller than the keypad and inserted in the keypad, wherein the front case formed with the keypad-accommodating portion includes a through hole through which a flexible printed circuit board passes so that the main PCB and the keypad PCB are electrically connected.

The mobile terminal may further include a keypad cover coupled to the keypad-accommodating portion in front of the keypad so that the plurality of key buttons can be exposed to outside, wherein the keypad cover includes: a keypad protective cover arranged on the keypad and coupled to the keypad-accommodating portion; and a keypad decorative cover coupled to a top of the keypad protective cover.

The mobile terminal may further include: a middle case arranged between the front and rear cases, assembled together with the front and rear cases, and including one side to which the main PCB is assembled; a power key unit coupled to one side of the main PCB and turning on/off operation of the main PCB; and a reset key unit coupled to the other side of the main PCB and initializing memory.

The power key unit may include a power-key tact switch provided at one side of the main PCB; a first switch shield provided in the middle case and passing the power-key tact switch therethrough while supporting and surrounding the power-key tact switch; a power-key water-resistant cap of a flexible material inserted in the first switch shield, airtightly sealing the first switch shield, and having a first protrusion shielding end portion adjacent to the power-key tact switch; and a power key inserted in and coupled to the power-key water-resistant cap and substantially pressing the power-key tact switch.

The first switch shield and the power-key water-resistant cap may have a non-circular section.

The power key may include: a first shaft to be inserted in an insertion portion of the power-key water-resistant cap; a first head formed at an exposed end portion of the first shaft; and a first flange provided between the first shaft and the first head, more expanded outward in a radial direction than a diameter of the first head, and serving to cover an entrance of the insertion portion stepped from the outer wall of the power-key water-resistant cap toward the first protrusion shielding end portion.

One of the first shaft and the insertion portion may be formed with a key block for direction-setting, and the other one may be formed with a key groove to which the key block is coupled.

The reset key unit may include a reset-key tact switch provided at the other side of the main PCB; a second switch shield provided in the main PCB to surround the reset-key tact switch and passing the reset-key tact switch therethrough; a reset-key water-resistant cap of a flexible material inserted in the second switch shield, airtightly sealing the second switch shield, and having a second protrusion shielding end portion adjacent to the reset-key tact switch; and a reset key inserted in and coupled to the reset-key water-resistant cap and substantially pressing the reset-key tact switch.

The second switch shield and the reset-key water-resistant cap may have a non-circular section.

The reset key may include a second shaft to be inserted in an insertion portion of the reset-key water-resistant cap; a second head formed at an exposed end portion of the second shaft; and a second flange provided between the second shaft and the second head, more expanded outward in a radial direction than the diameter of the second head, and serving to cover an entrance of the insertion portion stepped from the outer wall of the reset-key water-resistant cap toward the second protrusion shielding end portion.

The mobile terminal may further include a water-resistant rubber provided integrally with side keys and airtightly sealing up the front and rear cases between the front and rear cases.

The side keys may be symmetrically provided in opposite sides of the water-resistant rubber while forming a pair, and the pair of side keys may be partially exposed to an outside of the front and rear cases when the front and rear cases are assembled.

The side key may include a key protrusion protruding from the outer surface of the water-resistant rubber; and a key rod connected to the key protrusion, extended to the inside of the front and rear cases, and contacting the main PCB, and the side key may be made of the same material as the water-resistant rubber.

The mobile terminal may further include a plate member to be coupled to a rear of the key protrusion as being put on the key rod.

The mobile terminal may further include a display window coupling portion formed at one side of the water-resistant rubber and coupling with a display window.

The mobile terminal may further include a boundary rib protruding to form a boundary between the front and rear cases on inner and outer surfaces of the water-resistant rubber.

MODE FOR INVENTION

The attached drawings for illustrating preferred embodiments of the present invention are referred to in order to gain a sufficient understanding of the present invention, the merits thereof, and the objectives accomplished by the implementation of the present inventive concept.

Hereinafter, the present inventive concept will be described in detail by explaining preferred embodiments of the invention with reference to the attached drawings. However, descriptions about publicly known functions or configurations will be omitted for clarity.

A mobile terminal is a terminal freely usable while moving without regard to places. As a representative mobile terminal, there is a cellular phone or the like mobile communication terminal, a personal digital assistant (PDA), etc. Therefore, the term 'mobile terminal' involves the PDA, the cellular phone, etc., but the following descriptions will be limited to the PDA for the convenience of explanation.

Figure 1:
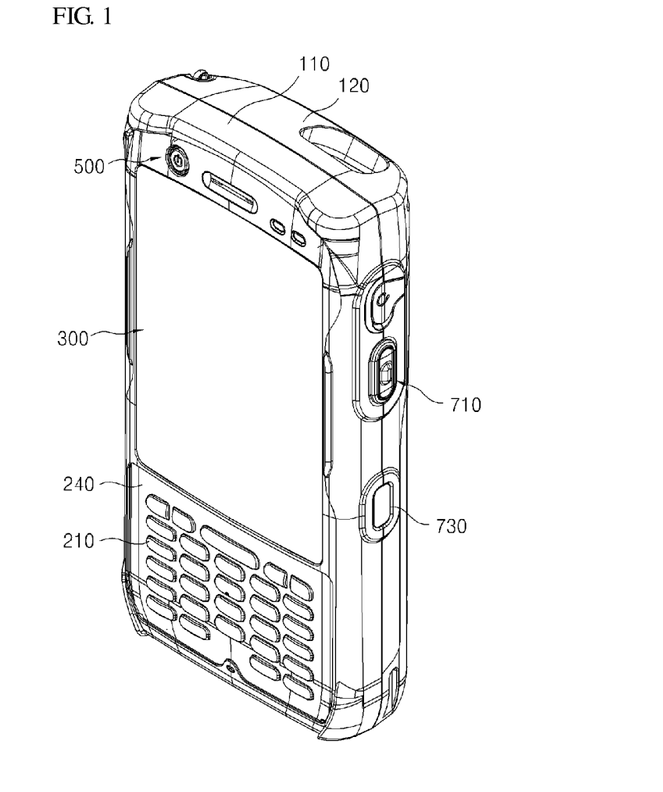
FIG. 1 is a perspective view of a mobile terminal according to an exemplary embodiment of the present inventive concept.
Figure 2:
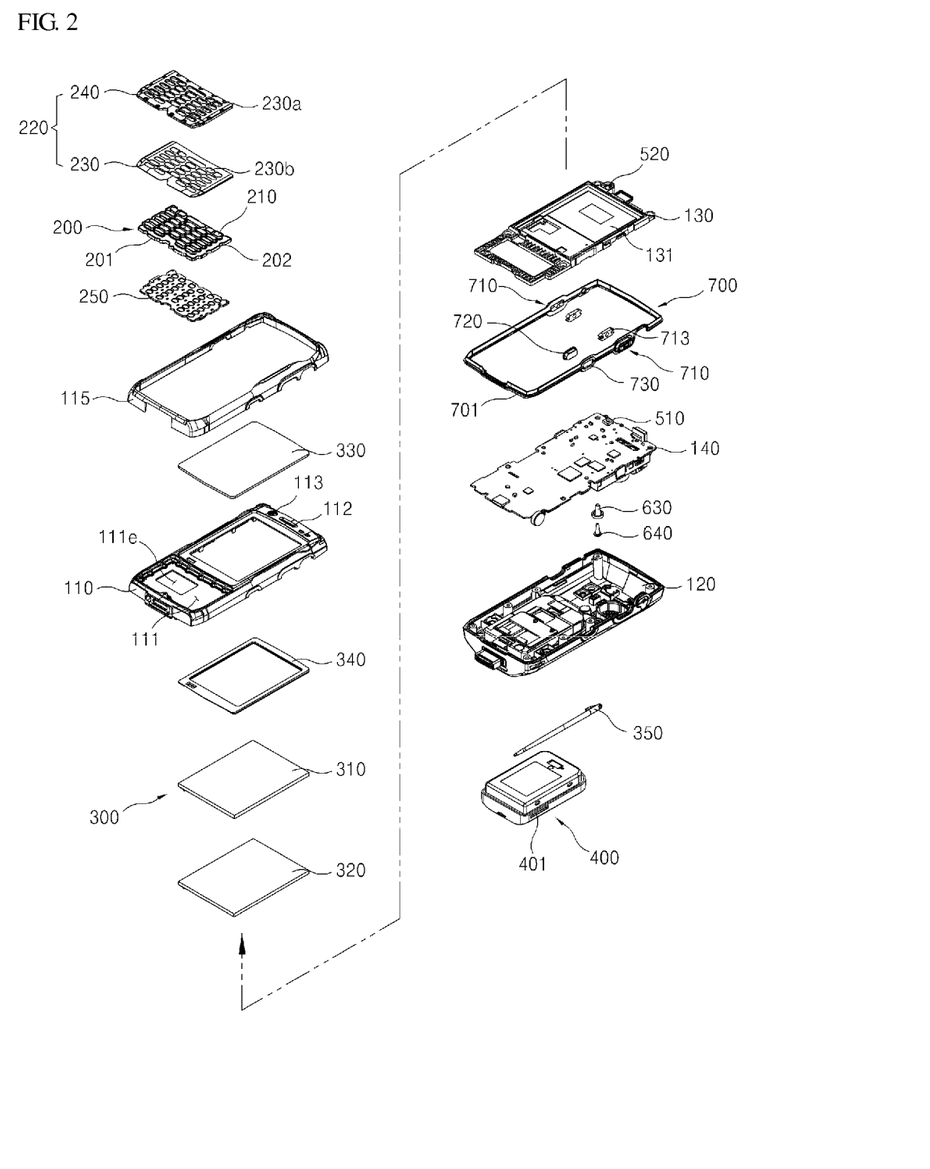
FIG. 2 is an exploded perspective view of the mobile terminal of FIG. 1.
Figure 3:
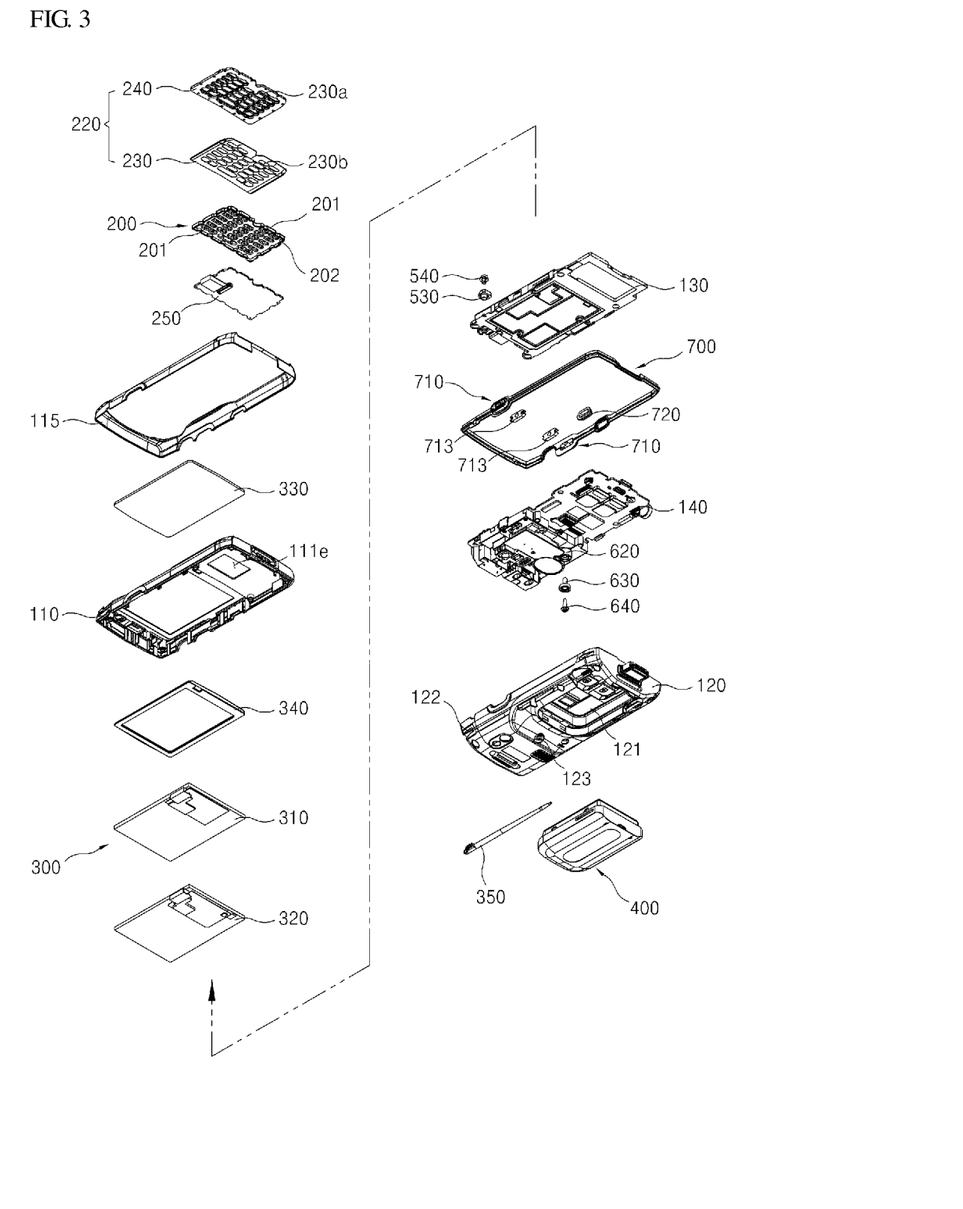
FIG. 3 shows the mobile terminal of FIG. 2 at a different angle.
Figure 4:
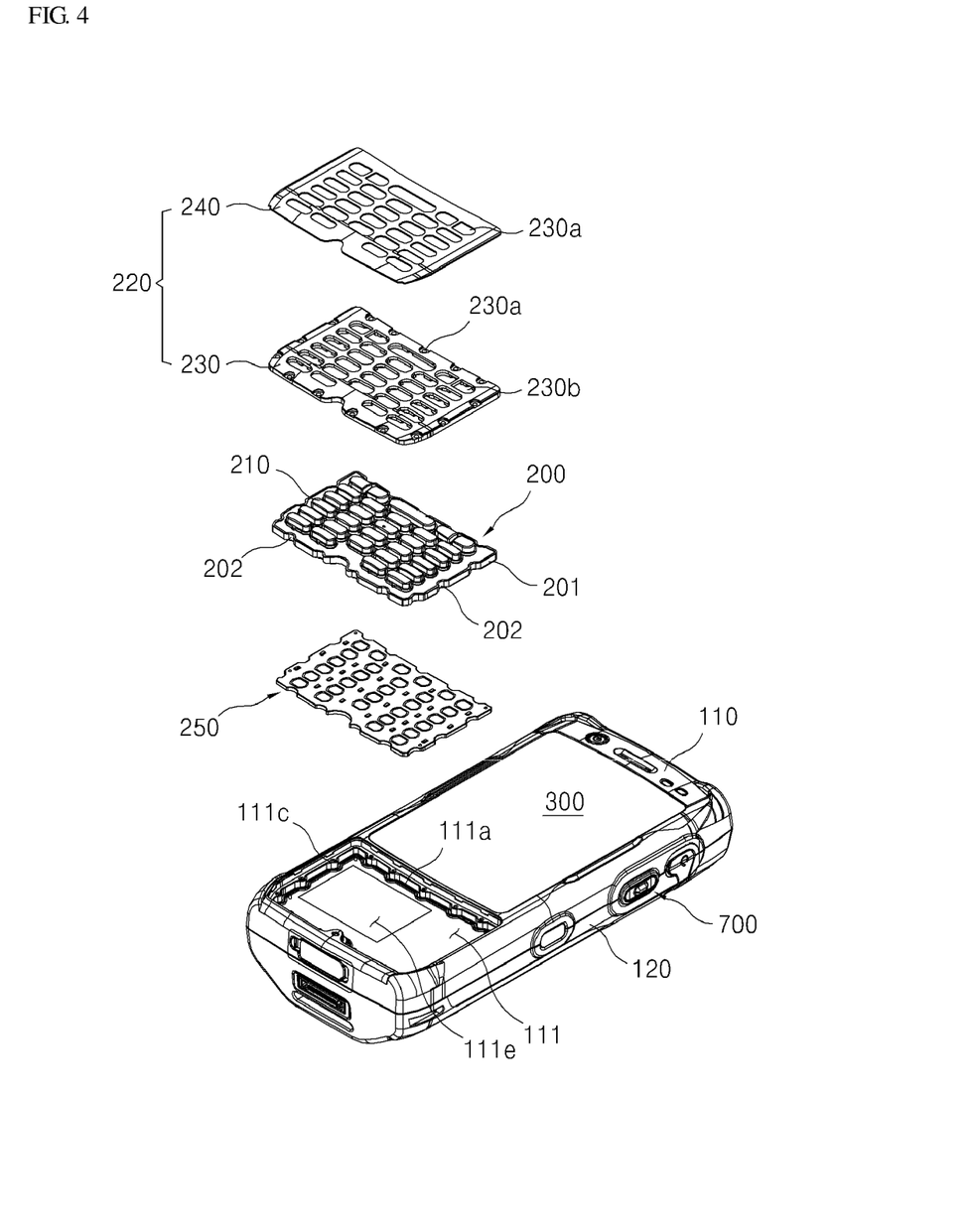
FIG. 4 is an exploded perspective view of a touch screen area.
Figure 5:
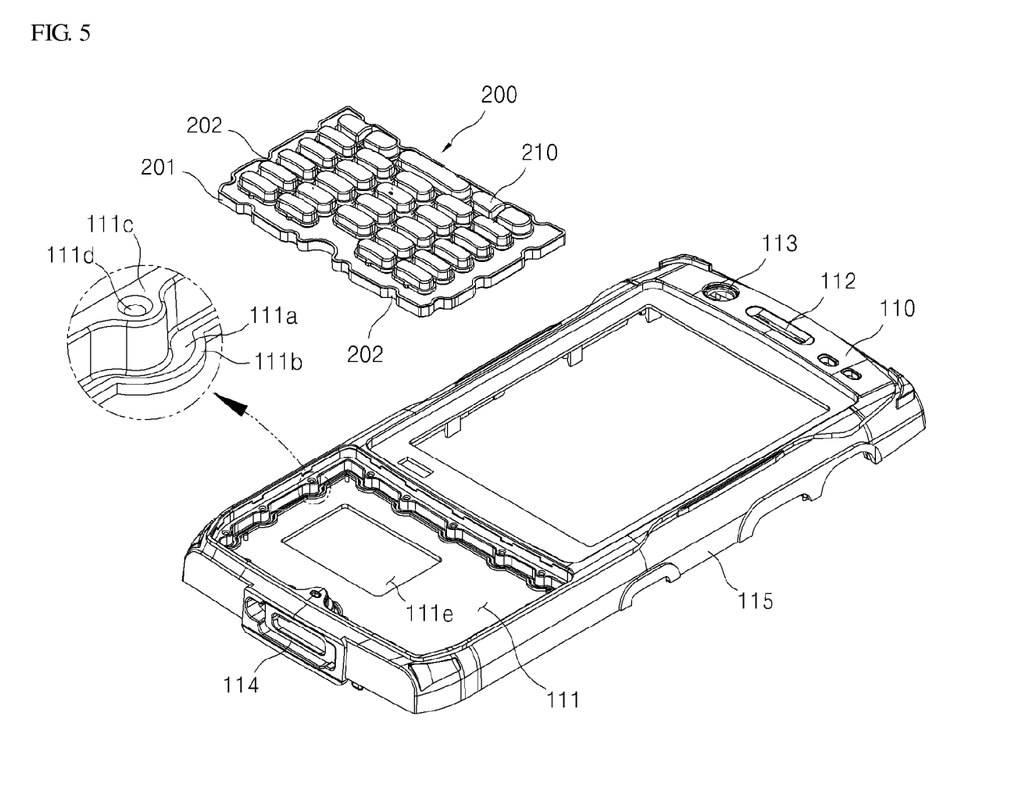
FIG. 5 is an enlarged exploded perspective view of a keypad and a front case.
Figure 6:
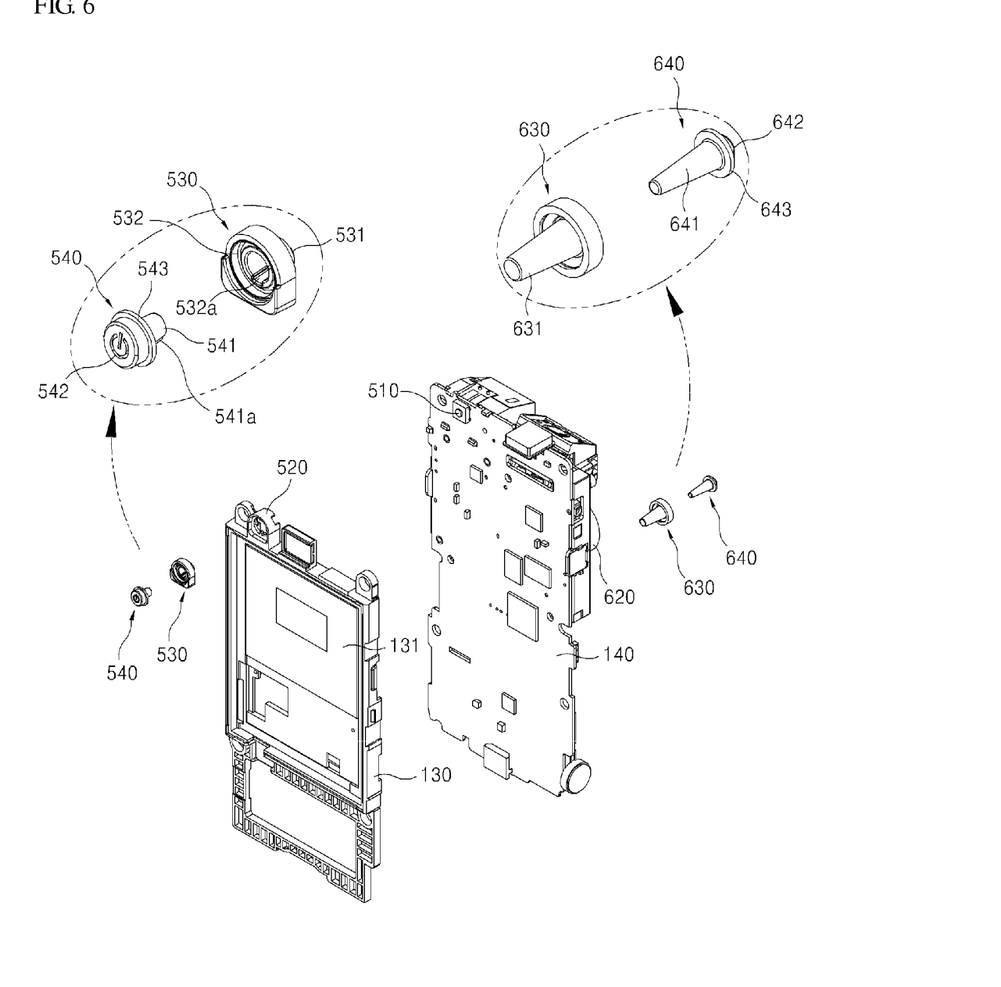
FIG. 6 is a partial exploded perspective view of a power key unit and a reset key unit.
Figure 7:
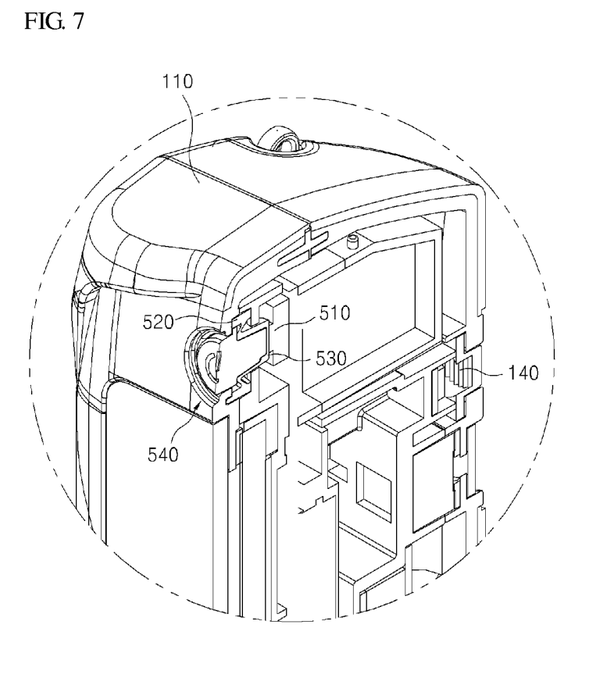
FIG. 7 is a cut-open perspective view of a power key area.
Figure 8:
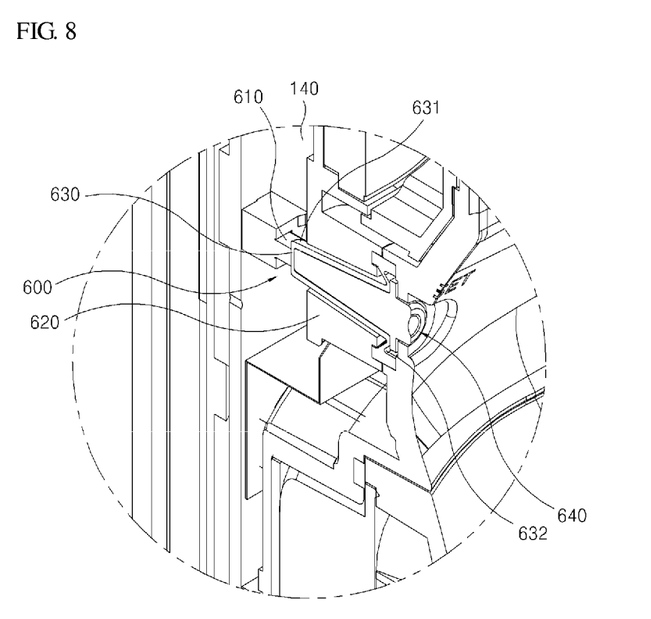
FIG. 8 is a cut-open perspective view of a reset key area.
Figure 9:
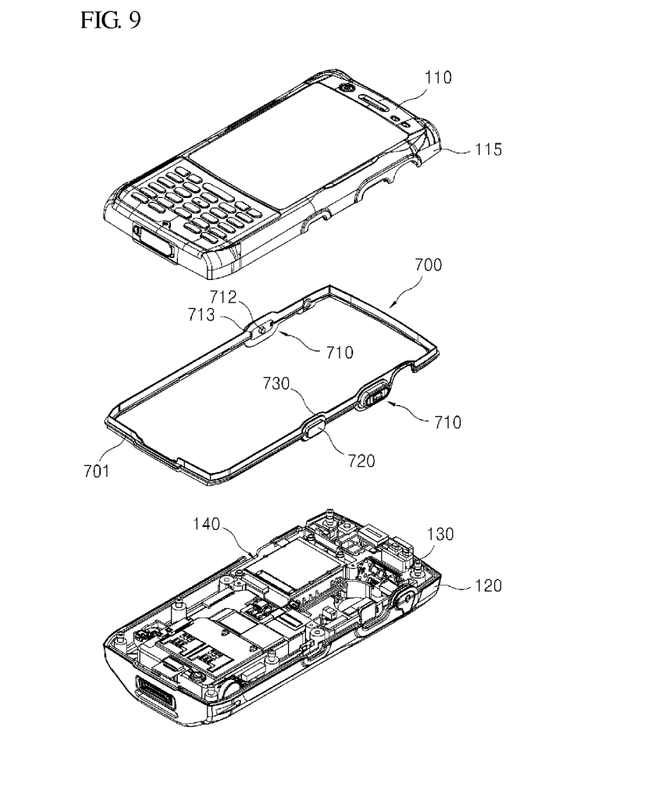
FIG. 9 is an exploded perspective view of a front case, a water-resistant rubber, and a rear case.
Figure 10:
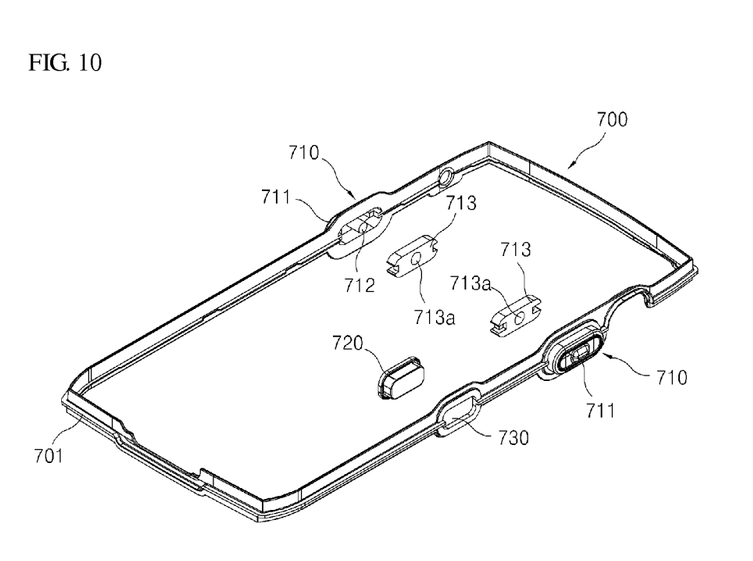
FIG. 10 is an exploded perspective view of the water-resistant rubber.

FIG. 1 is a perspective view of a mobile terminal according to an exemplary embodiment of the present inventive concept, FIG. 2 is an exploded perspective view of the mobile terminal of FIG. 1, FIG. 3 shows the mobile terminal of FIG. 2 at a different angle, FIG. 4 is an exploded perspective view of a touch screen area, FIG. 5 is an enlarged exploded perspective view of a keypad and a front case, FIG. 6 is a partial exploded perspective view of a power key unit and a reset key unit, FIG. 7 is a cut-open perspective view of a power key area, FIG. 8 is a cut-open perspective view of a reset key area, FIG. 9 is an exploded perspective view of a front case, a water-resistant rubber, and a rear case, and FIG. 10 is an exploded perspective view of the water-resistant rubber.

Among these drawings, referring mainly to FIGS. 1 and 3, the mobile terminal in this exemplary embodiment includes a front case 110 having a keypad-accommodating portion 111, a rear case 120 detachably coupled to the front case 110 at a rear surface of the front case 110, a middle case 130 arranged between the front and rear cases 110 and 120 and assembled together with the front and rear cases 110 and 120, and a flexible keypad 200 provided with a plurality of key buttons 210 and accommodated in the keypad-accommodating portion 111 of the front case 110.

The front case 110 is made by injection molding to form a front surface of the mobile terminal. The front case 110 is provided with a receiving hole 112, a power-key exposing hole 113, a terminal hole 114, etc. as well as the keypad-accommodating portion 111.

In this exemplary embodiment, a decorative case 115 is additionally coupled to the front surface of the front case 110 so as to protect the front case 110 and have a decorative effect. Of course, the decorative case 115 is optional and not indispensable. The decorative case 115 may undergo plating or coating unlike the front case 110.

The rear case 120 is detachably coupled to the front case 110 at the rear surface of the front case 110. A bolt is used in coupling the rear case 120 with the front case 110. The rear case 120 is also made by the injection molding.

The rear case 120 is formed with a battery-accommodating portion 121 recessed toward the front case 110. The battery-accommodating portion 121 detachably couples with a battery module 400. A locking and releasing structure where the battery module 400 is attached to and detached from the battery-accommodating portion 121 will be described later.

The rear case 120 is provided with a pen-accommodating portion 122 in which a touch pen 350 is accommodated, a reset-key exposing hole 123, etc. in addition to the battery-accommodating portion 121.

The middle case 130 made by the injection molding like the front and rear cases 110 and 120 is assembled together with the front and rear cases 110 and 120 between the front and rear cases 110 and 120.

The middle case 130 serves to not only support a main printed circuit board (PCB) 140 but also partially support the key pad 200 and a touch screen 300.

Thus, the mobile terminal 300 in this exemplary embodiment includes the middle case 130 to support the main PCB and partially support the keypad 200 and the touch screen 300, so that components can be firmly assembled and improved in durability.

Meanwhile, the mobile terminal in this exemplary embodiment further includes the touch screen 300 provided in the front case 110 and adjacent to the keypad 200 so that convenience in control can be enhanced with regard to the storage, maintenance, management, etc. of information. Of course, the scope of the present inventive concept is not limited thereto, and the touch screen 300 is not indispensable.

Prior to description about the keypad 200, the touch screen 300 will be described with reference to FIGS. 2 and 3.

The touch screen 300 includes an upper electrode 310 having a polyethylene terephthalate (PET) film with indium tin oxide (ITO), a lower electrode 320 having a glass substrate with ITO and a dot spacer formed toward the upper electrode 310, and a wiring (not shown) connecting the upper electrode 310 and the lower electrode 320 and electrically connected to the main PCB 140.

Also, the touch screen 300 in this exemplary embodiment includes tempered glass 330 coupled to the front surface of the front case 110, and a water-resistant tape 340 attached to the rear of the front case 110.

The tempered glass 330 is sealed after being coupled to the front surface of the front case 110, and the upper electrode 310 and the lower electrode 320 are partially accommodated and supported in an electrode-accommodating portion 131 formed on the surface of the middle case 130.

The touch screen 300 in this exemplary embodiment employs a resistive overlay touch screen. The resistive overlay touch screen may be classified into a 4-wire resistive overlay touch screen and a 5-wire resistive overlay touch screen. Any resistive overlay touch screen can be used, but the present exemplary embodiment describes the 4-wire resistive overlay touch screen by way of an example.

As described above, the touch screen 300 in this exemplary embodiment includes the upper electrode 310, the lower electrode 320 and the wiring (not shown), and has a structure that the dot spacer is formed on the lower electrode 320 and facing toward the upper electrode 310.

An operating principle is as follows. If voltage is applied to electrodes arranged in parallel with both sides of a transparent resistive film, electric potential is distributed between the electrodes. Since the resistance of the resistive film is uniform, the electric potential is linearly distributed and thus linear relation is seen between distance and the electric potential. The voltage is applied to the lower electrode 320, and voltage at a touched point is detected by the upper electrode 310 and converted into a digital value through an analog/digital (A/D) converter, thereby calculating a position on an X-axis. Also, the voltage is applied to the upper electrode 310, and the voltage is detected by the lower electrode 320 and converted into the digital value in the same manner, thereby calculating a position on a Y-axis. Then, coordinates of a point touched with a finger or the touch pen 350 can be finally determined.

In comparison, the 5-wire resistive overlay touch screen is as much excellent in reliability, durability and lifespan of a product as it is designed taking poor surroundings into account. Unlike the 4-wire resistive overlay touch screen, the 5-wire resistive overlay touch screen measures X and Y coordinates on a lower plate, and an upper plate serves as a sensor for measuring the voltage applied to the lower plate. If the touch screen is touched, it contacts the ITO applied to the inside of the upper plate. At this time, if the controller recognizes the contact on the ITO of the upper/lower plates, and applies a voltage for detecting the X coordinate to the ITO on the glass substrate, a potential difference is generated on the ITO of the lower plate. The ITO of the upper plate detects a potential value at a touched position and transmits it to the controller, and the controller converts the received potential value into a proper X coordinate. If the touch continues, the Y coordinate is obtained in the same manner. Such obtained X and Y coordinates are transmitted to a computer, the touched position is displayed on a screen.

Of course, the scope of the present inventive concept is not limited thereto, and alternatively the touch screen 300 in this exemplary embodiment may include a capacitive overlay touch screen, a surface acoustic touch screen, a tactile sensor touch screen, a piezoelectric touch screen, etc.

Next, the keypad 200 has an assembly structure as follows. Referring mainly to FIGS. 4 and 5, the keypad 200 in this exemplary embodiment is assembled at a corresponding position while having a structure of preventing water or moisture from entering a keypad area 200.

To this enc, an edge portion of the keypad 200 is provided with a water-resistant blade 201 extending toward the keypad-accommodating portion 111. On the bottom of the keypad-accommodating portion 111 is formed a blade-insertion rail 111a in which the water-resistant blade 201 is partially inserted.

The water-resistant blade 201 is continuously formed along a circumferential direction of the keypad 200. Since the keypad 200 has an approximately rectangular shape, the water-resistant blade 201 also has a continuous rectangular shape approximately, but not quite.

To fit with the water-resistant blade 201, the blade-insertion rail 111a has a continuous closed-loop shape corresponding to the water-resistant blade 201.

The blade-insertion rail 111a may be directly recessed on the bottom of the keypad-accommodating portion 111. However, in this exemplary embodiment, the blade-insertion rail 111a is formed by an outer wall of the keypad-accommodating portion 111, and a protrusion rib 111b protruding from the bottom at a position spaced apart from the outer wall.

If the water-resistant blade 201 of the keypad 200 is inserted in the blade-insertion rail 111a, the water-resistant blade 201 made of flexible rubber is held between the outer wall and the protrusion rib 111b of the keypad-accommodating portion 111, i.e., closely contacts at a corresponding position, thereby performing a water-resistant function. Accordingly, even if water enters the keypad area, it is prevented that water enters a keypad PCB 250 provided inside the keypad 200 or the main PCB 140 coupled to the middle case 130 and makes a trouble with the PCBs 250 and 140.

To assemble a keypad cover 220, there is provided a plurality of protrusions 111c protruding from the outer wall of the keypad-accommodating portion 111 toward a center area of the keypad-accommodating portion 111.

Further, on the edge portion of the keypad 200, a groove 202 is formed to be arranged corresponding to and be fit with the protrusion 111c. The protrusion 111c is formed with a screw hole 111d on the surface thereof, and the protrusion 111c and the groove 202 are shaped like a waveform.

The keypad PCB 250 smaller than the keypad 200 is inserted in the keypad 200. The front case 110 formed with the keypad-accommodating portion 111 is formed with a through hole 111e through which a flexible printed circuit board (PCB) passes so that the main PCB 140 and the keypad PCB 250 can be electrically connected to each other. The size of the through hole 111e is such as not to pass the keypad PCB 250 therethrough.

The keypad cover 220 is coupled to the keypad-accommodating portion 111 in front of the keypad 200 so that the key buttons 210 can be exposed to the outside. The keypad cover 220 includes a keypad protective cover 230 placed on the keypad 200 and coupled to the keypad-accommodating portion 111, and a keypad decorative cover 240 coupled to the top of the keypad protective cover 230.

The keypad protective cover 230 is formed with a screw hole 230a corresponding to the screw hole 111d of the protrusion 111c formed on the outer wall of the keypad-accommodating portion 111. The keypad protective cover 230 is screw-coupled to the keypad-accommodating portion 111, and the keypad decorative cover 240 is fitted to the keypad protective cover 230. Both the keypad protective cover 230 and the keypad decorative cover 240 are formed with exposing holes 230b and 240a through which the key buttons 210 are exposed to the outside.

Meanwhile, in addition to the foregoing structure, the mobile terminal in this exemplary embodiment further includes a power key unit 500, a reset key unit 600 and a water-resistant rubber 700 as shown in FIGS. 6 to 10.

First, the power key unit 500 is coupled to one side of the main PCB 140 and turns on/off the operation of the main PCB 140. Like the keypad 200, the power key unit 500 is also assembled at a corresponding position while having the water-resistant function.

As shown in FIGS. 6 and 7, the power key unit 500 includes a power-key tact switch 510 provided at one side of the main PCB 140; a first switch shield 520 provided in the middle case 130 and passing the power-key tact switch 510 therethrough while supporting and surrounding the power-key tact switch 510; a flexible power-key water-resistant cap 530 inserted in the first switch shield 520, airtightly sealing the first switch shield 520, and having a first protrusion shielding end portion 531 adjacent to the power-key tact switch 510; and a power key 540 inserted in and coupled to the power-key water-resistant cap 530 and substantially pressing the power-key tact switch 510.

The power-key water-resistant cap 530 does not have to be freely rotated within the first switch shield 520 after being coupled to the first switch shield 520 since it is a component fastened to the first switch shield 520. To this end, the first switch shield 520 and the power-key water-resistant cap 530 are manufactured to have a non-circular section.

The power key 540 includes a first shaft 541 to be inserted in an insertion portion 532 of the power-key water-resistant cap 530, a first head 542 formed at an exposed end portion of the first shaft 541, and a first flange 543 provided between the first shaft 541 and the first head 542.

The first flange 543 is more expanded outward in a radial direction than the diameter of the first head 542, and serves to cover an entrance of the insertion portion 532 stepped from the outer wall of the power-key water-resistant cap 530 toward the first protrusion shielding end portion 531.

Also, the power key 540 has to be coupled to the power-key water-resistant cap 530 in consideration of its directionality, and therefore the first shaft 541 of the power key 540 is formed with a direction setting key block 541a and the insertion portion 532 of the power-key water-resistant cap 530 is formed with a key groove 532a to which the direction setting key block 541a is coupled. Of course, the positions of the key block 541a and the key groove 532a may be exchanged with each other.

With this structure of the power key unit 500, in which the power-key water-resistant cap 530 for the water-resistant function is primarily assembled in the first switch shield 520 and then the power key 540 is secondarily assembled in the power-key water-resistant cap 530 so that the power-key tact switch 510 can be turned on and off by pressing the power key 540, it is possible to prevent water or moisture from entering an area of the power key 540 while fully guaranteeing the reliability of operation.

Next, the reset key unit 600 is as follows. The reset key unit 600 is used as a means for initializing various memories input by a user in the industrial PDA, such as a menu, information, schedule, etc. into a default value. That is, because it is inconvenient to delete the memories from the industrial PDA one by one the reset key unit 600 is vary useful in deleting and initializing various unnecessary memories at a time and reentering the menu, information and schedule so as to be conveniently used. The reset key unit 600 is coupled to the other side of the main PCB 140 and also has the water-resistant function.

As shown in FIGS. 6 and 8, the reset key unit 600 includes a reset-key tact switch 610 provided at the other side of the main PCB 140; a second switch shield 620 provided in the main PCB 140 to surround the reset-key tact switch 610 and passing the reset-key tact switch 610 therethrough; a flexible reset-key water-resistant cap 630 inserted in the second switch shield 620, airtightly sealing the second switch shield 620, and having a second protrusion shielding end portion 631 adjacent to the reset-key tact switch 610; and a reset key 640 inserted in and coupled to the reset-key water-resistant cap 630 and substantially pressing the reset-key tact switch 610.

The reset key unit 600 is different in shape from the power key unit 500, but has an approximately similar assembly or water-resistant structure to the power key unit 500. That is, the second switch shield 620 and the reset-key water-resistant cap 630 of the reset key unit 600 are also manufactured to have a non-circular section and thus there is no relative rotation.

The reset key 640 includes a second shaft 641 to be inserted in an insertion portion 632 of the reset-key water-resistant cap 630, a second head 642 formed at an exposed end portion of the second shaft 641, and a second flange 643 provided between the second shaft 641 and the second head 642. The second flange 643 is more expanded outward in a radial direction than the diameter of the second head 642, and serves to cover an entrance of the insertion portion 632 stepped from the outer wall of the reset-key water-resistant cap 630 toward the second protrusion shielding end portion 631.

With this structure of the reset key unit 600, in which the reset-key water-resistant cap 630 for the water-resistant function is primarily assembled in the second switch shield 620 and then the reset key 640 is secondarily assembled in the reset-key water-resistant cap 630 so that the reset-key tact switch 610 can be turned on and off by pressing the power key 640, it is possible to prevent water or moisture from entering an area of the reset key 640 while fully guaranteeing the reliability of operation.

Next, the water-resistant rubber 700 is as follows. As shown in FIGS. 9 and 10, the water-resistant rubber 700 serves to airtightly seal up the front and rear cases 110 and 120.

Technology of inserting a gasket between the front and rear cases 110 and 120 is general, but the water-resistant rubber 700 in this exemplary embodiment has a structure integrated with side keys 710 while having the water-resistant function beyond the general structure of the gasket.

The side keys 710 are symmetrically provided in opposite sides of the water-resistant rubber 700 while forming a pair. When the front and rear cases 110 and 120 are assembled, the pair of side keys 710 are partially exposed to the outside of the front and rear cases 110 and 120.

The side key 710 includes a key protrusion 711 protruding from the outer surface of the water-resistant rubber 700, and a key rod 712 connected to the key protrusion 711, extended to the inside of the front and rear cases 110 and 120 and contacting the main PCB 140.

The side key 710 where the key protrusion 711 and the key rod 712 are formed as a single body is made of the same flexible material as the water-resistant rubber 700, for example, rubber or silicon.

The side key 710 further includes a plate member 713 to be coupled to the rear of the key protrusion 711 as being put on the key rod 712. The plate member 713 is formed with a through hole 713a to be put on the key rod 712. The plate member 713 may be manufactured by the injection molding.

Further, a display window coupling portion 730 to which a display window 720 is coupled is formed at one side of the water-resistant rubber 700 at a position spaced apart from the side key 710. Likewise, the display window coupling portion 730 is formed integrally when the water-resistant rubber 700 is manufactured.

Also, a boundary rib 701 additionally protrudes to form a boundary between the front and rear cases 110 and 120 on the inner and outer surfaces of the water-resistant rubber 700. When the front and rear cases 110 and 120 are assembled, they are met each other with respect to the boundary rib 701.

Thus, the water-resistant rubber 700 formed integrally with the side keys 710 is interposed between the front and rear cases 110 and 120, so that water or moisture can be prevented from entering an area between the front and rear cases 110 and 120 after the front and rear cases 110 and 120 are assembled. Further, there is no process loss of separately assembling the side keys 710.

As above, a mobile terminal according to an exemplary embodiment has a structure simple and uncomplicated to be easily manufactured and assembled, and specially prevents water or moisture from entering a keypad area.

While this invention has been particularly shown and described with reference to preferred embodiments thereof, it will be understood by those skilled in the art that various changes in form and details may be made therein without departing from the spirit and scope of the invention as defined by the appended claims.

INDUSTRIAL APPLICABILITY

The present inventive concept can be applied to an industrial mobile terminal.

The invention claimed is:
1. A mobile the second switch shield terminal comprising a front case comprising a keypad-accommodating portion;
a rear case detachably coupled to the front case at a rear surface of the front case with a component accommodating space, in which a main printed circuit board (PCB) is arranged, therebetween; and
a keypad of a flexible material accommodated in the keypad-accommodating portion of the front case and provided with a plurality of key buttons,
the keypad comprising a water-resistant blade placed at an edge thereof and extending toward the keypad-accommodating portion, and the keypad-accommodating portion comprising a blade-insertion rail placed on a bottom thereof and partially inserting the water-resistant blade therein; and
a reset key unit coupled to the other side of the main PCB and initializing memory, wherein the reset key unit comprises:
a reset-key tact switch provided at the other side of the main PCB;
a second switch shield provided in the main PCB to surround the reset-key tact switch and passing the reset-key tact switch therethrough;
a reset-key water-resistant cap of a flexible material inserted in the second switch shield, airtightly sealing the second switch shield, and having a second protrusion shielding end portion adjacent to the reset-key tact switch, and
wherein the second switch shield and the reset-key water-resistant cap have a non-circular section.

2. The mobile terminal according to claim 1, wherein the water-resistant blade is continuously formed along a circumferential direction of the keypad, and the blade-insertion rail is shaped like a continuous closed loop corresponding to the water-resistant blade.

3. The mobile terminal according to claim 1, wherein the blade-insertion rail is formed by an outer wall of the keypad-accommodating portion and a protrusion rib protruding from the bottom of the keypad-accommodating portion at a position spaced apart from the outer wall.

4. The mobile terminal according to claim 1, wherein the outer wall of the keypad-accommodating portion is formed with a plurality of protrusions protruding toward a center area of the keypad-accommodating portion, and
the edge of the keypad is formed with a groove to be arranged corresponding to and be fit with the protrusion.

5. The mobile terminal according to claim 4, wherein the protrusion and the groove are shaped like a waveform.

6. The mobile terminal according to claim 1, further comprising a keypad PCB smaller than the keypad and inserted in the keypad,
wherein the front case formed with the keypad-accommodating portion comprises a through hole through which a flexible printed circuit board passes so that the main PCB and the keypad PCB are electrically connected.

7. The mobile terminal according to claim 1, further comprising a keypad cover coupled to the keypad-accommodating portion in front of the keypad so that the plurality of key buttons can be exposed to outside,
wherein the keypad cover comprises:
a keypad protective cover arranged on the keypad and coupled to the keypad-accommodating portion; and
a keypad decorative cover coupled to a top of the keypad protective cover.

8. The mobile terminal according to claim 1, further comprising:
a middle case arranged between the front and rear cases, assembled together with the front and rear cases, and comprising one side to which the main PCB is assembled; and
a power key unit coupled to one side of the main PCB and turning on/off operation of the main PCB.

9. The mobile terminal according to claim 8, wherein the power key unit comprises
a power-key tact switch provided at one side of the main PCB;
a first switch shield provided in the middle case and passing the power-key tact switch therethrough while supporting and surrounding the power-key tact switch;
a power-key water-resistant cap of a flexible material inserted in the first switch shield, airtightly sealing the first switch shield, and having a first protrusion shielding end portion adjacent to the power-key tact switch; and
a power key inserted in and coupled to the power-key water-resistant cap and substantially pressing the power-key tact switch.

10. The mobile terminal according to claim 9, wherein the first switch shield and the power-key water-resistant cap have a non-circular section.

11. The mobile terminal according to claim 9, wherein the power key comprises:
a first shaft to be inserted in an insertion portion of the power-key water-resistant cap;
a first head formed at an exposed end portion of the first shaft; and
a first flange provided between the first shaft and the first head, more expanded outward in a radial direction than a diameter of the first head, and serving to cover an entrance of the insertion portion stepped from the outer wall of the power-key water-resistant cap toward the first protrusion shielding end portion.

12. The mobile terminal according to claim 11, wherein one of the first shaft and the insertion portion is formed with a key block for direction-setting, and the other one is formed with a key groove to which the key block is coupled.

13. The mobile terminal according to claim 8, wherein the reset key unit further comprises;
a reset key inserted in and coupled to the reset-key water-resistant cap and substantially pressing the reset-key tact switch.

14. The mobile terminal according to claim 8, wherein the reset key comprises
a second shaft to be inserted in an insertion portion of the reset-key water-resistant cap;
a second head formed at an exposed end portion of the second shaft; and
a second flange provided between the second shaft and the second head, more expanded outward in a radial direction than the diameter of the second head, and serving to cover an entrance of the insertion portion stepped from the outer wall of the reset-key water-resistant cap toward the second protrusion shielding end portion.

15. The mobile terminal according to claim 1, further comprising a water-resistant rubber provided integrally with side keys and airtightly sealing up the front and rear cases between the front and rear cases.

16. The mobile terminal according to claim 15, wherein the side keys are symmetrically provided in opposite sides of the water-resistant rubber while forming a pair, and the pair of side keys are partially exposed to an outside of the front and rear cases when the front and rear cases are assembled.

17. The mobile terminal according to claim 15, wherein the side key comprises
a key protrusion protruding from the outer surface of the water-resistant rubber; and
a key rod connected to the key protrusion, extended to the inside of the front and rear cases, and contacting the main PCB, and
the side key is made of the same material as the water-resistant rubber.

18. The mobile terminal according to claim 17, further comprising a plate member to be coupled to a rear of the key protrusion as being put on the key rod.

19. The mobile terminal according to claim 15, further comprising a display window coupling portion formed at one side of the water-resistant rubber and coupling with a display window.

20. The mobile terminal according to claim 15, further comprising a boundary rib protruding to form a boundary between the front and rear cases on inner and outer surfaces of the water-resistant rubber.

* * * * *